May 1, 1962     J. WILSON     3,031,769
FLUID BEDS
Filed Sept. 23, 1959
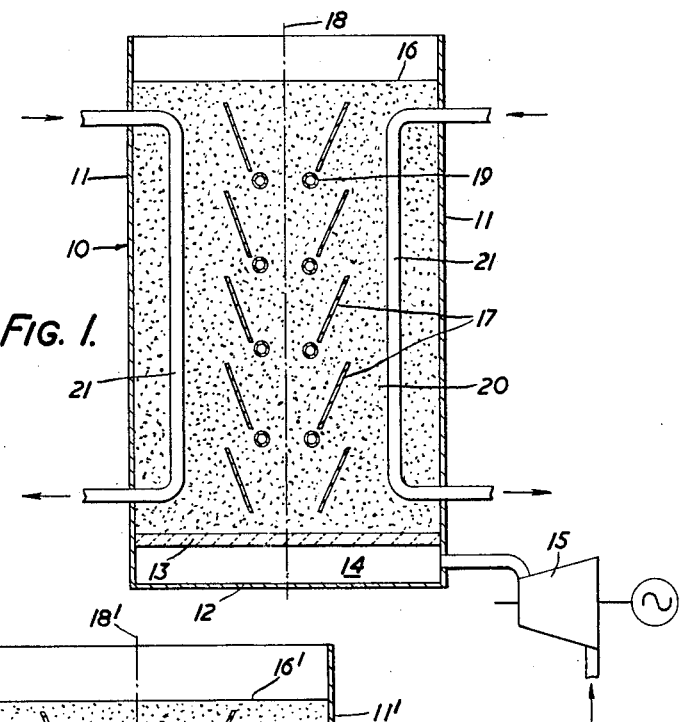
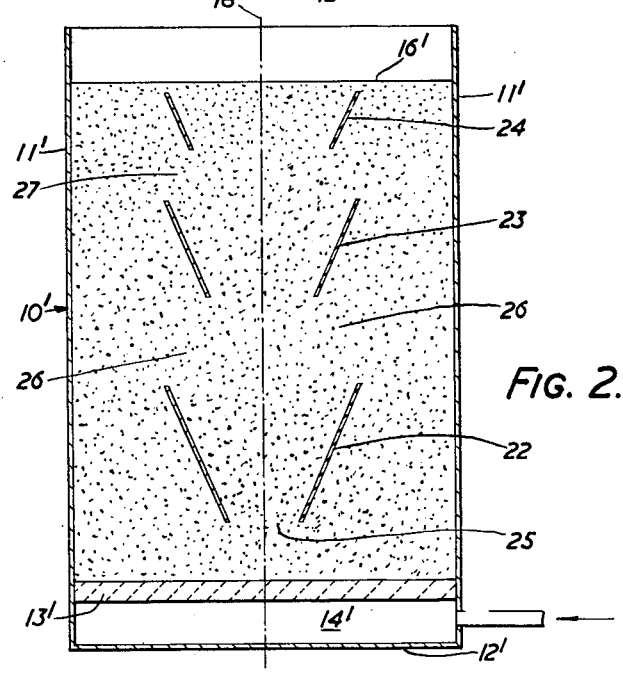
INVENTOR
JOHN WILSON
BY
Watson, Cole, Grindle & Watson
ATTORNEY

United States Patent Office 3,031,769
Patented May 1, 1962

3,031,769
FLUID BEDS
John Wilson, 208 Bramhall Lane S., Bramhall, England
Filed Sept. 23, 1959, Ser. No. 841,835
Claims priority, application Great Britain Sept. 26, 1958
7 Claims. (Cl. 34—57)

This invention relates to fluid beds.

The use of fluid beds has become widespread over recent years particularly in the oil refining and chemical industries because of their many advantages to such industries. For example, a fluid bed provides a very uniform temperature by reason of very rapid heat transfer and the large heat capacity of the solids employed, and the particles provide very extended surfaces on which reactions may occur.

When a gas at very low velocity is admitted through, for example, a porous plate to the bottom of a container holding a bed consisting of a large quantity of small discrete solid particles, the gas percolates upwards through the bed without agitating the individual particles. When the velocity of the gas is increased sufficiently, the pressure drop across the bed becomes equal to or slightly in excess of the weight of the solids present. At this point the solids are suspended in the gas and the bed is fluidised. A properly fluidised bed is stable in the sense that all the solid particles are in an approximately uniform state of turbulence, and the density of the bed remains approximately uniform throughout. It has been found, however, that with the conventional fluid bed this condition exists only when the bed is relatively shallow. As the depth of the bed increases a form of instability occurs, in that the fluidising gas tends to form bubble-like cavities which rise upwardly through the bed, expanding as they rise. These bubbles occur predominantly in the central parts of the bed. In other parts of the bed, on the other hand, the particles tend to settle into relatively immobile and closely-packed masses. This phenomenon is commonly referred to as a "boiling bed" and is recognised as giving much less satisfactory performance than a stable bed, but since deep beds are desirable for many purposes the disadvantages of the "boiling" phenomenon have had to be tolerated. For example, "boiling" beds cannot be used for treating materials in the form of delicate webs, because owing to the excessive and irregular turbulence considerable tension has to be exerted on the webs to draw them through the bed. Moreover, the thermal efficiency of a "boiling" bed is substantially less than that of a stable bed, possibly because of the lower particle density in the bubbles and the reduced movement of particles in the more static parts of the bed.

It is an object of the present invention to provide a deep fluidised bed which will remain effectively stable throughout its depth.

A fluidised bed according to the present invention comprises a vessel containing small discrete solid particles and having means for admitting gas at or near the bottom of the vessel to fluidise the particles, and outwardly inclined deflectors arranged in pairs, one pair above another, for removing upwardly-flowing gas from the central part of the bed at different levels and deflecting this gas towards outer parts of the bed, these deflectors or other means being arranged to introduce additional gas between the pairs of deflectors so as to maintain the particles in a substantially uniform state of turbulence throughout the depth of the bed, at least in the central part of the bed.

The removal of gas from the central part of the bed at different levels in the bed tends to prevent the formation of bubbles at each of these levels, while the means for introducing additional gas at least partly serves to replace the gas so withdrawn from the central part of the bed and maintain the fluidisation. In effect, the invention is equivalent to the superimposition of several shallow, stable beds.

In one form of the invention the means for admitting further gas comprises perforated or porous tubes extending horizontally through the bed in the vicinity of the lower edges of the deflectors. With such an arrangement the deflectors may all be of substantially the same size and arranged uniformly in pairs one above the other.

In another form of the invention the admission of additional gas is achieved by the disposition of the deflectors, whereby the additional gas which is admitted to the central part of the bed between the lower edges of a pair of deflectors reaches this central part by inward diffusion from the part of the bed outside the next lower pair of deflectors. With this form of the invention it has been found that the deflectors should get progressively narrower towards the top of the bed in order that the desired results can be obtained.

In the case of a bed intended for heat exchange purposes, heating or cooling surfaces may be provided in the part of the bed outside the deflectors.

The invention may be performed in various ways and two embodiments will now be described by way of example with reference to the accompanying drawings, in which:

FIGURE 1 is a transverse vertical section through one embodiment; and

FIGURE 2 is a transverse vertical section through a second embodiment.

It will be appreciated that the drawings are diagrammatic, the object being to illustrate the principles underlying the invention rather than the particular details of design and construction.

Referring to FIGURE 1, the fluid bed comprises a deep vessel 10 having imperforate side walls 11 and an imperforate base 12. Spaced a short distance above the base 12 is a floor 13 which is air-permeable, being constructed, for instance, of porous tiles. To the space 14 between the base 12 and the floor 13, air is admitted from a compressor 15 at a pressure of, for instance, 2 lbs. per square inch gauge.

Resting on the floor 13 is a layer of sand which, when the bed is fluidised, is maintained in turbulent suspension in the air flowing upwardly through the vessel. The sand is carried up to the level 16.

Extending for the full length of the vessel are five pairs of inclined deflectors 17. These deflectors are uniformly spaced one above the other on each side of a longitudinal centre line 18. Adjacent the lower edges of each deflector 17, except the lowest pair, are horizontal porous tubes 19 through which compressed air is admitted either from the air box 14 or from the compressor 15 through pipes or passages which are not shown.

As the air rises up through the bed, it carries with it particles in suspension and in a high state of turbulence, but as the air continues to rise it would tend to form bubbles, particularly in the vicinity of the centre line 18.

The deflectors 17 and the tubes 19 counteract this tendency. By disposing the deflectors as indicated, some of the air rising between each pair of deflectors can escape through the gaps 20 between the upper edges of the lower pair of deflectors and the lower edges of the pair immediately above. This removal of air tends to prevent the formation of bubbles. However, if the supply of air in the centre of the bed is not to be seriously depleted, additional air must be introduced to make up for the air so withdrawn. This air is introduced through the porous tubes 19. The resulting effect is as if the deep bed illustrated consists of several superimposed shallow, stable beds.

In view of the turbulence of the particles there is a considerable migration of particles towards and away from the centre line 18, and these particles thus frequently come into contact with, or into close relationship with, heat exchanger tubes 21 disposed in the outer parts of the bed. At least a substantial proportion of the particles which receive heat from these tubes or impart heat to them will travel to the central part of the bed where they will give up heat to or take up heat from whatever material is being introduced into the bed along the centre line 18.

In the embodiment shown in FIGURE 2 parts which are equivalent to the corresponding parts in FIGURE 1 are given the same reference numerals with the suffix 1.

In this embodiment there are three sets of deflectors 22, 23 and 24.

Some of the air which has passed up between the lower pair of deflectors 22, having entered through the gap 25 between the lower edges of these deflectors, leaves the central part of the bed through the gaps 26 between the upper edges of the deflectors 22 and the lower edges of the next higher deflectors 23. A similar outward movement of air occurs through the gaps 27 between the deflectors 23 and 24. Replacement of this air is in this embodiment effected through the same gaps 26 and 27 but in the opposite direction, by air which was previously flowing up through the bed outside the deflectors below. For example, in the gaps 26 air will flow outwardly from between the deflectors 23 while air will also flow inwardly from outside the deflectors 22. This inflowing air will replace some, but usually not all, of the air flowing out through the gaps 26, and will enter between the lower edges of the deflectors 23 to augment the air which has passed up between the deflectors 22 and which has not escaped through the gaps 26.

Since with this embodiment it is not practicable to replace from the outer parts of the bed all the air that escapes through the gaps, the depths of the deflectors have to be correspondingly reduced towards the top of the bed. In other words, considering the apparatus as a plurality of superimposed shallow beds, these beds get shallower towards the top.

What I claim as my invention and desire to secure by Letters Patent is:

1. A fluidised bed comprising a vessel, small discrete solid particles contained in said vessel, gas admission means adjacent the bottom of said vessel for producing an upward flow of gas through said vessel and maintaining said particles in a fluidized state, and a plurality of pairs of horizontally opposed deflectors in said vessel and each completely embedded in said particles beneath the upper level of said particles in their fluidized state, said pairs being arranged one above another, the deflectors of each pair being disposed in upwardly diverging formation, and having their lower edges parallel and at the same height above the bottom of said vessel and spaced apart by a distance to permit the entry between the deflectors of the pair of sufficient gas to fluidise the particles between the deflectors of the pair.

2. A fluidised bed comprising a vessel, small discrete solid particles contained in said vessel, gas admission means adjacent the bottom of said vessel for producing an upward flow of gas through said vessel and maintaining said particles in a fluidized state, and a plurality of pair of boards in said vessel and each completely embedded in said particles beneath the upper level of said particles in their fluidized state, each said board having a longitudinal axis, said longitudinal axes being parallel and horizontal, said pairs being arranged one above another and the boards of each pair being outwardly inclined to one another to deflect upwardly flowing gas outwardly, said boards having their lower edges parallel and at the same height above the bottom of said vessel and spaced apart by a distance to permit the entry between the deflectors of the pair of sufficient gas to properly fluidise the particles between the deflectors of the pair.

3. A fluidised bed comprising a vessel, small discrete solid particles contained in said vessel, gas admission means adjacent the bottom of said vessel for producing an upward flow of gas through said vessel and maintaining said particles in a fluidized state, and a plurality of pairs of parallel deflectors in said vessel and each completely embedded in said particles beneath the upper level of said particles in their fluidized state, said pairs being arranged one above another, each deflector having a lower horizontal edge and an upper horizontal edge, each pair being arranged with the lower edges of the deflectors of the air at the same height above the bottom of said vessel and closer together than the upper edges of the deflectors of the pair, said lower edges of the deflectors of the pair being spaced apart to permit the entry between the deflectors of the pair of sufficient gas to properly fluidise the particles between the deflectors of the pair.

4. A fluidised bed comprising a vessel, small discrete solid particles contained in said vessel, gas admission means adjacent the bottom of said vessel for producing an upward flow of gas through said vessel and maintaining said particles in a fluidized state, and a plurality of pairs of parallel deflectors in said vessel and each completely embedded in said particles beneath the upper level of said particles in their fluidized state, said pairs being arranged one above another, each deflector having a lower horizontal edge and an upper horizontal edge, each pair being arranged with the lower edges of the deflectors of the pair closer together than the upper edges of the deflectors of the pair and a plurality of horizontal porous tubes, one arranged adjacent the lower edge of each deflector, and means supplying gas through said porous tubes and into said particles.

5. A fluidised bed according to claim 4 in which said deflectors are all of the same size and in which said pairs are arranged at equal distances above one another.

6. A fluidised bed comprising a vessel, small discrete solid particles contained in said vessel, gas admission means adjacent the bottom of said vessel for producing an upward flow of gas through said vessel and maintaining said particles in a fluidized state, and a plurality of pairs of parallel deflectors in said vessel and each completely embedded in said particles beneath the upper level of said particles in their fluidized state, said pairs being arranged one above another, each deflector having a lower horizontal edge and an upper horizontal edge, each pair being arranged with the lower edges of the deflectors of the pair at the same height above the bottom of said vessel and closer together than the upper edges of the deflectors of the pair, said lower edges of the deflectors of the pair being spaced apart by a distance to permit the entry between the deflectors of the pair of sufficient gas to properly fluidise the particles between the deflectors of the pair, the breadth of the deflectors getting progressively narrower from the lowermost pair to the uppermost pair.

7. A fluidised bed comprising a vessel, small discrete solid particles contained in said vessel, gas admission means adjacent the bottom of said vessel for producing an upward flow of gas through said vessel and maintaining said particles in a fluidized state, and a plurality of pairs of parallel deflectors in said vessel and each completely embedded in said particles beneath the upper level of said particles in their fluidized state, said pairs being arranged one above another, each deflector having a lower horizontal edge and an upper horizontal edge, each pair being arranged with the lower edges of the deflectors of the pair at the same height above the bottom of said vessel and closer together than the upper edges of the deflectors of the pair, said lower edges of the deflectors of the pair being spaced apart by a distance to permit the entry between the deflectors of the pair of sufficient gas to properly fluidise the particles between the deflectors of the pair, and heat exchange surfaces in said vessel.

References Cited in the file of this patent

UNITED STATES PATENTS

| | | |
|---|---|---|
| 2,697,881 | Kelley | Dec. 28, 1945 |
| 2,741,546 | Sweeney et al. | Apr. 10, 1956 |
| 2,889,269 | Micholsen | June 2, 1959 |
| 2,938,276 | Doleman et al. | May 31, 1960 |
| 2,964,852 | Doleman et al. | Dec. 20, 1960 |